No. 614,416. Patented Nov. 15, 1898.
W. BESTIE & W. F. BILGER.
APPARATUS AND COMPOSITION FOR REPAIRING PNEUMATIC TIRES.
(Application filed Apr. 5, 1897.)

(No Model.)

Witnesses
E. C. Wurdeman
J. J. Williamson

Inventors
William Bestie
William F. Bilger
By Geo. H. Holgate
Attorney

THE NORRIS PETERS CO., PHOTO-LITHO., WASHINGTON, D. C.

UNITED STATES PATENT OFFICE.

WILLIAM BESTIE AND WILLIAM F. BILGER, OF MEMPHIS, TENNESSEE, ASSIGNORS TO JOHN J. DUPUY, OF SAME PLACE, AND B. W. ARNOLD, OF MONT VALE, VIRGINIA.

APPARATUS AND COMPOSITION FOR REPAIRING PNEUMATIC TIRES.

SPECIFICATION forming part of Letters Patent No. 614,416, dated November 15, 1898.

Application filed April 5, 1897. Serial No. 630,792. (No model.)

*To all whom it may concern:*

Be it known that we, WILLIAM BESTIE and WILLIAM F. BILGER, citizens of the United States, residing at Memphis, in the county of Shelby and State of Tennessee, have invented a certain new and useful Improvement in the Method of and Composition for Repairing Pneumatic Tires for Bicycles and the Like, of which the following is a specification.

Our invention relates to a new and useful improvement in the method of and composition for repairing pneumatic tires for bicycles and the like, and has for its object to provide a suitable compound which when applied by our method will completely close punctures or fractures of a pneumatic tire from the interior and also render said tire less likely to leakage from small punctures, as well as providing for the closing of leakages while the tire is in use and without the necessity of using a syringe or other implement.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1:
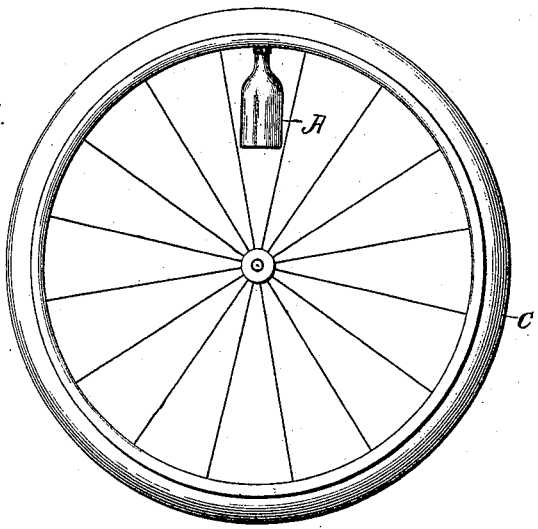
Figure 2:
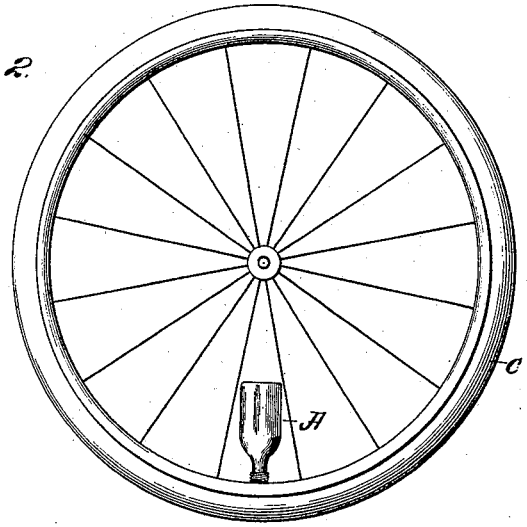
Figure 3:
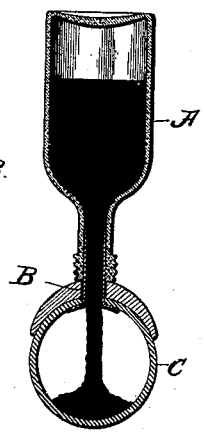

Figure 1 represents a bicycle-wheel having the valve and spring removed from the pump-tube, the bottle containing the repair fluid being placed upon said tube in an upright position; Fig. 2, a similar view showing the wheel revolved through half a turn, thus bringing the bottle in an inverted position; and Fig. 3, a section of a bottle made in accordance with our improvement and fitted to the tube, the latter also being in section.

In carrying out our invention as here embodied we provide a suitable fluid of the composition hereinafter set forth, which has the quality of freely flowing, and at the same time when partially or entirely set will close a puncture in the tire, as well as fill the pores thereof, so as to prevent minute leakages, which usually take place in such tires. This fluid is placed in a receptacle, such as a bottle A of the design shown in Fig. 3, the interior diameter of the neck thereof being adapted to snugly fit around the valve-tube B of the tire C. The method followed in applying this fluid is to fit the neck of the bottle over the tube B when the latter is in a depending position, as shown in Fig. 1, and then turn the tire half around, thereby bringing the bottle to an inverted position, as shown in Fig. 2, when the contents of the bottle will tend to flow within the tire, which tendency may be accelerated by deflating the tire and compressing the same, so as to force a portion of the air therein into the bottle, and then expanding said tire, so as to bring about a suction which will draw the contents of the bottle therefrom to the tire. Now by removing the bottle and replacing the valve and closing the same and finally slowly revolving the wheel, so as to cause the fluid to flow around the interior walls of the tire, the pores in the material of which the tire is composed will be completely closed, as well as any punctures which may exist therein, and when this fluid has sufficiently set it will be found that the tire will be air-tight and will withstand any pressure which it originally was capable of withstanding.

In practice it is usually preferable to force a certain amount of air within the tire before revolving the same for the flowing of the sealing fluid, in order that the tire may be somewhat expanded, as well as for the purpose of forcing the fluid into the pores and openings.

The fluid which we prefer to use, and which we have heretofore designated as the "Universal Bicycle Puncture Cure," is composed of the following ingredients, combined in the proportions named below: glycerin, four ounces; fullers' earth, one-half teaspoonful; plumbago, one-half teaspoonful. These ingredients are thoroughly mixed and form a black fluid to be introduced into the interior of the punctured tire, as above described, and when so applied will not only close the pores and any punctures which may be in the tire, but when a sufficient quantity is introduced will remain in a fluid state to such an extent that should future punctures occur this fluid will close the same, and it has been found by experiment that the tire will be rendered safe for upward of a month after one application of our improved fluid in the manner set forth.

The receptacle for the sealing fluid is preferably a bottle having a neck adapted to just fit the valve-tube, as clearly shown and as above set forth.

We do not wish to be limited to the exact ingredients of the above-named fluid.

One of the advantages of the particular fluid which we have here designated is that it in no wise injures the tire, nor is it injurious to the person using the same.

Having thus fully described our invention, what we claim as new and useful is—

1. The combination with a bicycle and its vent or other tube extending through the rim and into the tire, of a vessel open at its mouth only and secured with its mouth in open communication with the tube, as and for the purpose set forth.

2. The herein-described composition of matter to be used for sealing pneumatic tires, consisting of glycerin, fullers' earth and plumbago in the proportions specified.

In testimony whereof we have hereunto affixed our signatures in the presence of two subscribing witnesses.

WILLIAM BESTIE.
WILLIAM F. BILGER.

Witnesses:
S. S. WILLIAMSON,
T. H. ARNOLD.